Dec. 21, 1943.    J. H. COHEN    2,337,293
FAN
Filed April 23, 1940
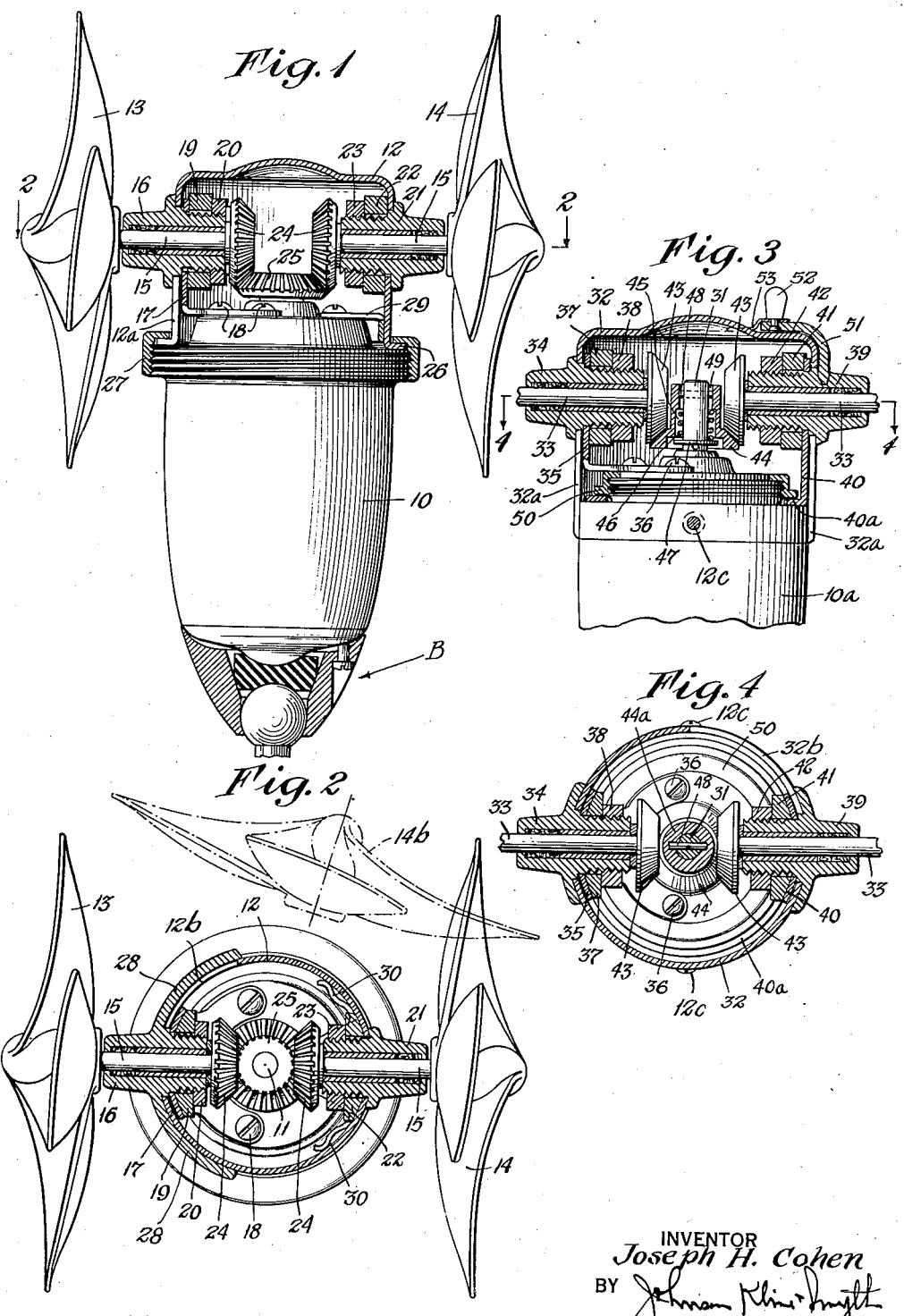
INVENTOR
Joseph H. Cohen
BY
ATTORNEYS Patented Dec. 21, 1943

2,337,293

UNITED STATES PATENT OFFICE 2,337,293

FAN

Joseph H. Cohen, Bridgeport, Conn., assignor to Casco Products Corporation, Bridgeport, Conn., a corporation of Connecticut Application April 23, 1940, Serial No. 331,097

12 Claims. (Cl. 230—259)

This invention relates to fans, and, more particularly, to a multiple fan construction having a plurality of relatively adjustable fans driven from a single shaft.

The device of the present invention has been illustrated as having rubber or flexible blades and particularly adapted to be mounted adjacent a windshield of a motor vehicle for defrosting purposes, but the invention in its broadest aspects is not limited to such a construction and use.

Fans having blades of rubber or other flexible material have been proposed heretofore for use as defrosting units for windshields of motor vehicles, but generally these previously proposed fans have consisted of a single fan secured to the shaft of the motor mounted contiguous to the portion of the windshield in front of the driver's position. A fan so mounted circulated air against the windshield directly in front of the driver and maintained visibility through that portion of the windshield. Such a fan circulated very little air however, against other portions of the windshield, and, consequently, the driver's vision under adverse driving conditions was limited to that portion of the windshield against which air was directed.

To obviate this hazard, devices have been proposed in which a plurality of relatively adjustable fans, supported by a single bracket or the like adjacent the windshield, circulated air over the entire windshield.

The device of the present invention comprises a plurality of relatively adjustable fans each having a shaft radially extending about and coupled to a shaft driven by a motor or the like adapted to be adjustably mounted to a support adjacent the windshield.

A feature of the present invention is the manner in which the plurality of fans are mounted for relative adjustment, but yet are driven from a single shaft.

In the embodiment of the invention illustrated, a motor including a shaft driven thereby is mounted to extend in a substantially vertical position. The motor shaft carries driving means cooperable with similar means carried by a pair of fan shafts, extending radially of the motor shaft, which couple the fan shafts to the motor shaft for rotation therewith.

Means are provided for fixedly supporting one of said fan shafts on the motor while the other is mounted to and supported by means rotatably mounted on the motor. In one form of the invention herein shown, the rotatable support comprises a casing housing the driving means and fixed support. The casing and, consequently, the fan shaft carried thereby can be rotatably moved, the fixed fan shaft riding in a slot formed in the casing, so that the one shaft may be adjusted angularly relative to the other.

In another form of the invention illustrated, the rotatable support comprises a bracket carried by said motor and housed within a casing fixed to the motor. The casing is provided with a slot within which the rotatably supported shaft may ride as it is angularly adjusted relative to the axis of the motor shaft. To facilitate the adjustment of the fan in this form of the invention, a knob is provided which may be grasped by a user when it is desired to change or adjust the position of the fan.

To hold both the rotatably mounted casing and bracket in a desired position after once adjusted, resilient means are provided for frictionally engaging adjacent stationary members to hold the casing or bracket, and, consequently, the fan shaft carried thereby in the desired adjusted position.

If experience shows that either or both fans should be adjusted, this can be done by adjusting the motor to position the fixedly supported fan to the proper desired position and then rotating the casing to adjust the fan carried thereby to the desired proper position.

The driving means are shown, in one form of the invention, as a plurality of properly intermeshing bevel gears carried by the ends of the several shafts. The gears, although positively driving the fan shafts through the motor shaft, permit the rotatably mounted fan shaft to be angularly moved. The driving means may, as shown, also comprise a friction disk on the motor shaft resiliently held in engagement with a similar disk carried by each fan shaft.

Other features and advantages will hereinafter appear.

In the accompanying drawing:

Figure 1 is a side elevational view partly in section.

Fig. 2 is a sectional view taken along line 2—2 of Fig. 1.

Fig. 3 is a sectional view showing a modified form of the invention with part of the motor and fan shafts broken away.

Fig. 4 is a sectional view taken along line 4—4 of Fig. 3.

As shown in the accompanying drawing, the present invention comprises a motor 10, having a suitable bracket B, including a ball and socket connection, by means of which the motor may be mounted to extend in a generally upright position. The motor 10 has a shaft 11 extending therefrom and carries at the top thereof a casing 12. The motor 10, through shaft 11, drives a pair of rubber or flexible bladed fans 13 and 14 suitably mounted to the ends of stub or fan shafts 15.

The shaft carrying the fan 13 is provided with a bearing sleeve 16 secured in an angle plate 17 fastened to the motor by screws 18. The bearing sleeve 16 is inserted through an aperture in the angle plate 17 and is secured thereto by a spacing washer 19 and a nut 20. The shaft carrying the fan 14 is provided with a similar bearing sleeve 21 fixed in an aperture formed in the casing 12 by a spacing washer 22 and a nut 23.

The fan shafts 15 are disposed radially of the motor shaft 11, and are provided at their ends with bevelled gears 24, each meshing with a bevel gear 25 secured to the end of the motor shaft 11.

The casing 12 is provided with a slot 12a to allow the casing to be mounted to the top of the motor 10 after the bearing sleeves and their associated parts have been assembled. The slot 12a receives the bearing sleeve 16 when the casing 12, carrying the bearing sleeve 21, is assembled with the motor 10. The casing 12 is provided with a flange 26 slidably mounted on the top of the motor and held thereto by a screw cap 27.

The bearing sleeve 16 extends through an elongated slot 12b extending substantially at right angles to the slot 12a so that the housing may be rotated to adjust the bearing sleeve 21 and the fan 14 through a desired angle without interference with the bearing sleeve 16.

To close the slot 12b against the intrusion of dirt, etc., and to improve the appearance of the device, the bearing sleeve 16 is provided with a pair of laterally projecting wings 28 curved to conform to the periphery of the casing 12 and permit the casing to slide in back of it.

An arm 29 is secured to the top portion of the motor and has downwardly projecting resilient portions 30 which engage the inner surface of the casing 12 to hold the casing in a desired adjusted position.

When the fan is to be installed on the instrument board of an automobile adjacent the windshield, the bracket is preferably positioned at a point midway of the windshield, and the motor 10 is positioned so that the fan 13 is in proper position to circulate air over the portion of the windshield in front of the driver. After this is done, the fan 14 is adjusted by rotating the casing 12 about the axis of the motor, thus moving the shaft 15 for the fan 14 and its bearing sleeve 21 to such an angular position relative to the motor 10, that the air circulated by the fan 14 will be thrown against and properly defrost the portion of the windshield in front of the seat next to the driver.

If experience shows that either or both fans should be adjusted, this can be done by rotating the motor 10 to adjust the fan 13 to a proper position and then rotating the casing 12 to adjust the fan 14 to its proper position.

There is shown in Figs. 3 and 4 of the drawing, a modified form of the present invention, wherein the motor 10a drives a shaft 31 and carries a casing 32 fixed thereto by suitable screws 12c. The motor 10a, as in the previously described form of the invention, drives a pair of shafts 33 to which are to be secured fans, not shown, similar to fans 13 and 14 of the form of the invention shown in Figs. 1 and 2.

The shaft 33, shown at the left in Fig. 3, has a bearing sleeve 34 which is secured in an angle plate 35 fastened to the motor end by screws 36. The bearing sleeve 34 is inserted through an aperture in the angle plate 35 and is secured thereto by a nut 38, there being a spacing washer 37 between the angle plate 35 and the nut 38.

The second shaft has a bearing sleeve 39 which is secured in an arm 40 upwardly extending from a ring member 40a slidably mounted on the top of the motor and held thereto by a screw cap 50. The bearing sleeve 39 is inserted through a suitable aperture in the arm 40 and is secured thereto by a spacing washer 41 and a nut 42. The casing 32 is formed with a pair of slots 32a to the end that the casing may be slipped over the end of the motor 10a after the bearing sleeves and their associated parts are assembled.

The shafts 33 are disposed radially of the motor shaft 31 and each are provided at their inner ends with a bevelled friction disk 43 engaging a similar shaped friction disk 44 secured to the end of the motor shaft 31.

To insure a good frictional drive, the present invention provides means for resiliently urging the disk 44 into engagement with the disks 43. To this end, the disk 44 carries a coaxial sleeve 44a provided with an enlarged bore 45 receiving a spring 46 seating on a collar 47 carried by the shaft 31. The opposite end of the spring engages an annular internal shoulder formed by the enlarged bore 45 and normally urges the sleeve 44a outwardly of the shaft and the disk 44 into good frictional engagement with the disks 43.

To couple the sleeve 44a to the shaft 31 for rotation therewith, but yet allow axial movement of the sleeve 44a with respect to the shaft 31, a pin 48, diametrically carried by an end of the shaft 31, has the opposite ends thereof disposed in grooves 49 formed in the restricted bore of the sleeve 44. The pin 48 keys the sleeve 44a to the shaft 31 for rotation therewith, but yet allows the sleeve 44a and the disk 44 movement longitudinally of the shaft 31.

The bearing sleeve 39 extends through an elongate slot 32b formed in the casing 32 so that the bearing sleeve 39 might be angularly adjusted with respect to the bearing sleeve 34.

To facilitate adjustment of the bearing sleeve 39, the same is provided with an arm 51 lying without the casing 32 and terminating at the top of the casing in a knob or handle 52 which may be grasped by the user to angularly adjust the bearing sleeve 39.

To hold the bearing sleeve 39 in a desired adjusted position, a resilient finger 53 carried by the arm 51 frictionally engages the outer surface of the casing 32 and holds the arm 51 and sleeve 39 in the desired adjusted position.

When the fan of this embodiment of the present invention is to be installed on the instrument panel, the bracket, not shown, is secured adjacent the windshield again preferably at a point midway of the same. The motor 10a is adjusted so that the same extends in a substantially vertical position with the left-hand fan disposed so as to circulate air over the portion of the windshield in front of the driver. The right-hand fan is then adjusted by grasping the knob 52 and moving the same so as to position the right-hand fan to direct air against that portion of the windshield in front of the seat next to the driver.

Variations and modications may be made within the scope of this invention and portions of the improvements may be used without others.

I claim:

1. In a device of the type described, a pair of shafts; a fan secured to an end of each shaft; a motor including a shaft driven thereby; means for coupling the fan shafts to said motor shaft for rotation therewith; means fixed to said motor for supporting one of said fan shafts; and a casing having a slot therein through which the fixedly supported fan shaft extends, said casing being rotatably secured to said motor and supporting the other of said fan shafts, whereby the one shaft may be adjusted relative to the other.

2. In a device of the type described, a pair of shafts; a fan secured to an end of each shaft; a motor including a shaft driven thereby; means for coupling the fan shafts to said motor shaft for rotation therewith; means fixed to said motor for supporting one of said fan shafts; and a casing having a slot formed therein through which said last-named shaft extends, said casing housing said supporting and coupling means and being rotatably secured to said motor for supporting the other of said fan shafts, the last-named shaft being movable to different angular positions relative to said fixed shafts upon rotation of said casing.

3. In a device of the type described, a pair of shafts; a fan secured to an end of each shaft; a motor including a shaft driven thereby; means for coupling the fan shafts to said motor shaft for rotation therewith; means fixed to said motor for supporting one of said fan shafts; and a casing rotatably secured to said motor for supporting the other of said fan shafts, said casing having a slot through which the fixedly supported shaft projects, whereby the casing may be rotated to angularly adjust the relative positions of said fan shafts.

4. In a device of the type described, a pair of angularly disposed shafts; a fan secured to an end of each shaft; a motor including a shaft driven thereby; means for coupling the fan shafts to said motor shaft for rotation therewith; means fixed to said motor for rigidly supporting one of said fan shafts; means, rotatably secured to said motor, for supporting the other of said fan shafts for angular movement relative to said motor shaft; and a casing secured to said motor, said casing housing the driving means and said fan shaft supporting means, the adjustably supported fan shaft riding in a slot formed in said casing and being angularly adjustable with respect to the other of said fan shafts.

5. In a device of the type described, a pair of angularly disposed shafts; a fan secured to an end of each shaft; a motor including a shaft driven thereby; means for coupling the fan shafts to said motor shaft for rotation therewith; means fixed to said motor for rigidly supporting one of said fan shafts; means rotatably secured to said motor, supporting the other of said fan shafts for angular movement relative to said motor shaft; a casing secured to said motor, said casing housing the driving means and said fan shaft supporting means, the adjustably supported fan shaft riding in a slot formed in said casing and being angularly adjustable with respect to the other of said fan shafts; and manually operable means lying without said casing for adjusting the angular position of said adjustable shaft relative to the other.

6. In a device of the type described, a motor including a shaft driven thereby; a pair of shafts radially extending about said motor shaft; a fan secured to the outer end of each radially extending shaft; means for coupling the fan shafts to said motor shaft for rotation therewith; a bearing sleeve disposed about each fan shaft; a bracket fixed to said motor for receiving and supporting one of said bearing sleeves; and a casing rotatably secured to said motor for supporting the other of said bearing sleeves, said casing having a slot through which said fixedly supported bearing sleeve extends to allow said casing to be rotated so that the fan supported thereby may be adjusted relative to the fixedly supported fan.

7. In a device of the type described, a motor including a shaft driven thereby; a casing rotatably secured to said motor and housing the end of said shaft, said casing provided with a pair of apertures; a pair of fan shafts each projecting through an aperture; means for coupling the fan shafts to said motor shaft for rotation therewith; and means fixed to said motor for supporting one of said fan shafts, the other of said fan shafts being supported by said casing, the aperture through which said fixedly supported fan shaft extends comprising an elongate slot, the slot permitting the casing and the shaft supported thereby a limited angular movement relative to said fixedly supported shaft.

8. In a device of the type described, a motor including a shaft driven thereby; a pair of fan shafts radially extending from said motor shaft; driving means interposed between the motor shaft and the fan shafts; a casing rotatably secured to said motor, said casing provided with an aperture therethrough and an elongate slot, one of said fan shafts extending through said aperture, the other extending through said slot; and means fixed to said motor for supporting the fan shaft extending through said slot, the fan shaft extending through said aperture being supported by said casing for movement therewith, whereby said shaft may be angularly adjusted relative to the other of said fan shafts.

9. In a device of the type described, a motor including a shaft driven thereby; a pair of shafts radially extending about said motor shaft; a fan secured to the outer end of each radially extending shaft; means for coupling the fan shafts to said motor shaft for rotation therewith; a bearing sleeve disposed about each fan shaft; a bracket fixed to said motor for receiving and supporting one of said bearing sleeves; a casing rotatably secured to said motor for supporting the other of said bearing sleeves, said casing having a slot through which said fixedly supported bearing sleeve extends to allow said casing to be rotated so that the fan shaft supported thereby may be adjusted relative to the fixedly supported fan shaft; and projections carried by said fixedly supported bearing sleeve engaging the outer surface of said casing and covering said slot in all adjusted positions of said casing.

10. In a device of the type described, a motor including a shaft driven thereby; a pair of angularly disposed fan shafts radially extending from an end of said motor shaft; means for coupling the fan shafts to said motor shaft for rotation therewith; a bracket carried by said motor for rigidly supporting one of said fan shafts; a bracket rotatably secured to said motor supporting the other of said fan shafts; a casing fixed to said housing, the fan shafts projecting through a wall of said casing, said casing being formed with a slot through which said rotatably supported shaft extends; and manually operable means for adjusting the position of said rotatably supported fan shaft relative to the slot so that said shaft may be moved to different angular positions relative to the other fan shaft.

11. In a device of the type described, a motor including a shaft driven thereby; a pair of fan shafts radially extending about said motor shaft; a fan secured to the outer end of each radially extending shaft; means for coupling the fan shafts to said motor shaft for rotation therewith; a bearing sleeve disposed about each fan shaft; a bracket fixed to said motor for rigidly supporting one of said bearing sleeves; a bracket rotatably secured to said motor for supporting the other of said bearing sleeves; a casing housing said coupling means and brackets, said casing being fixed to said motor and having a slot through which said rotatably supported bearing sleeve extends to allow said bearing to be moved to different positions along said slot whereby the relative angular position between the fan shafts can be adjusted; and manually operable means fixed to said rotatably supported sleeve for adjusting the position of said sleeve.

12. In a device of the type described having a motor including a shaft driven thereby and a pair of angularly disposed shafts each provided with a fan; means for drivingly connecting said motor shaft and fan shafts comprising of a friction disk coaxially carried by said motor shaft; a friction disk carried by each of said fan shafts; a coaxial sleeve carried by said first-named disk, said sleeve being formed with an enlarged bore; a spring disposed about said motor shaft and housed within said enlarged bore; and means carried by said motor shaft for seating one end of said spring, the other end of said spring engaging a shoulder formed by said enlarged bore and urging the sleeve outwardly of said motor shaft and the disk into good frictional engagement with the disks carried by said fan shafts.

JOSEPH H. COHEN.